(12) United States Patent
Fujita et al.

(10) Patent No.: US 6,572,451 B1
(45) Date of Patent: Jun. 3, 2003

(54) SPECTACLE LENS MACHINING METHOD AND APPARATUS

(75) Inventors: Hakaru Fujita, Tokyo (JP); Isao Iizuka, Tokyo (JP); Yasushi Sakai, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 09/980,779

(22) PCT Filed: Oct. 17, 2001

(86) PCT No.: PCT/JP01/09098

§ 371 (c)(1),
(2), (4) Date: Jan. 16, 2002

(87) PCT Pub. No.: WO02/32604

PCT Pub. Date: Apr. 25, 2002

(30) Foreign Application Priority Data

Oct. 17, 2000 (JP) .................................. 2000-316948
Apr. 13, 2001 (JP) .................................. 2001-115338
Oct. 15, 2001 (JP) .................................. 2001-317166

(51) Int. Cl.$^7$ ............................................... B24B 1/00
(52) U.S. Cl. ............................. 451/42; 451/43; 451/44
(58) Field of Search ............................. 451/42, 43, 44, 451/64, 225

(56) References Cited

U.S. PATENT DOCUMENTS 6,328,630 B1 * 12/2001 Jinbo et al. .................. 451/42

FOREIGN PATENT DOCUMENTS

| JP | 09-290399 A | 11/1997 |
| JP | 09-314498 A | 12/1997 |
| JP | 11-10427 A | 1/1999 |
| JP | 2001-121330 A | 5/2001 |

* cited by examiner

Primary Examiner—Hung Xuan Dang
(74) Attorney, Agent, or Firm—Oliff & Berridge PLC

(57) ABSTRACT

The present invention makes it possible to perform machining that forms holes or grooves for the attachment of parts to the outer circumferential edge surfaces of lenses of various lens patterns, both accurately and with good reproducibility, by means of a simple operation. The spectacle lenses 100 are positioned so that the machining areas of the spectacle lenses 100 are maintained in a fixed positional relationship with the machining reference position of the machining apparatus 200 by using spectacle lens fastening devices 400 which can fasten the spectacle lenses 100 with attached spectacle lens holding jigs 110 in place, and adjust the positions of these spectacle lenses 100, to cause specified positions on the spectacle lenses 100 to contact the reference surfaces of a positioning reference plate 300.

8 Claims, 5 Drawing Sheets

SPECTACLE LENS MACHINING METHOD AND APPARATUS

TECHNICAL FIELD

The present invention relates to a spectacle lens machining method and apparatus which form holes, notches, and grooves or the like used for the attachment of parts to the outer circumferential end surfaces or the like of a spectacle lens.

BACKGROUND ART

In recent years, rimless type spectacles (rimless spectacles) have attracted attention because of the advantages offered by such spectacles in terms of a broad field of vision, light weight and the like. Such rimless type spectacles include a type in which the circumference of the lower part of each lens is supported by a nylon thread, known as the "Nylor" type, a type called the "two-point" or "three-piece" type in which screw holes are formed through the lenses, and the lenses are fastened in place by screws that are passed through these screw holes, and the so-called "PIN-FEEL" type, in which blind holes are formed in the edge surfaces of the lenses, and pin-form projecting parts of the spectacle lens holding members are inserted and fastened in these blind holes. Rimless spectacles of the various types described above have respective special features. However, in the case of such spectacles, it is not always easy to achieve a design that sufficiently ensures a wide effective field of vision, durability, esthetic appearance and a reduction in weight, etc., for lenses of various thicknesses and various materials. Furthermore, such spectacles are not always satisfactory from the standpoint of machining costs and the like.

In recent years, therefore, rimless spectacles of a type in which cutouts or the like are formed in the edges of the spectacle lenses, and attachment members are attached by being inserted into these cutouts, have been proposed. For example known spectacles of this type include the spectacles described in Japanese Patent No. 2997438 (Japanese Patent Application Laid-Open No. H10-228000), the spectacles described in Japanese Utility Model Registration No. 2602605 (Japanese Utility Model Application Laid-Open No. H7-32620, and the spectacles described in Japanese Patent Application Laid-Open No. 2000-147435.

In the case of spectacle lenses, the magnification ordinarily varies from user to user, and the shape of the lenses also depends on the shape of the frames selected by the user. Accordingly, the thickness and shape of spectacle lenses generally show individual variations. Consequently, when lenses used in the rimless spectacles involved in the abovementioned proposals are machined by a machining apparatus with numerical control or the like, it is necessary to perform complicated positioning machine on a case by case basis in accordance with the shape and thickness of the lenses, so that the machining efficiency is conspicuously poor.

With the foregoing in view, it is an object of the present invention to provide an spectacle lens machining method and apparatus which make it possible to perform machining that forms holes or notches or grooves or the like for the attachment of parts to the outer circumferential edge surfaces of lenses of various lens patterns, both accurately and with good reproducibility, by means of a simple operation.

DISCLOSURE OF THE INVENTION

The first means used as means for solving the abovementioned problems constitute a spectacle lens machining method for machining spectacle lenses using a machining apparatus after spectacle lens edging has been performed in which the abovementioned spectacle lenses are edged so that they conform to the spectacle frame shape, wherein the machining by the abovementioned machining apparatus is performed with the spectacle lenses fastened to spectacle lens fastening devices which are disposed in the vicinity of the machining position of the abovementioned machining apparatus, the abovementioned spectacle lens fastening devices being equipped with fastening parts that fasten the abovementioned spectacle lenses in a specified positional relationship, and the abovementioned spectacle lens fastening devices positioning the abovementioned spectacle lenses fastened to the abovementioned fastening parts by adjusting the positions of the abovementioned spectacle lenses relative to the abovementioned machining apparatus, and, as the fastening devices, are used those device said fastening parts of which have a structure in which the spectacle lenses are fastened to the fastening devices by fastening spectacle lens holding jigs which are attached to the machining reference positions of the spectacle lenses beforehand as jigs for fastening the spectacle lenses to the edging machine during the abovementioned edging.

The second means comprise a spectacle lens machining method in which a spectacle lens of a specified shape is machined by means of a machining apparatus, this method comprising a spectacle lens holding jig attachment step of attaching a spectacle lens holding jig to a specified position on the abovementioned spectacle lens, a spectacle lens fastening step of fastening the abovementioned spectacle lens by mounting the abovementioned spectacle lens holding jig in a spectacle lens fastening device which is disposed in the vicinity of the machining position of the abovementioned machining apparatus, which fastens the abovementioned spectacle lens in a specified positional relationship as a result of the mounting of the abovementioned spectacle lens holding jig, and which positions the abovementioned spectacle lens by adjusting the position of the abovementioned spectacle lens fastening device, a positioning step of positioning the spectacle lens by adjusting the position of the abovementioned spectacle lens fastening device so that a specified position on the abovementioned spectacle lens is caused to contact a specified position on a positioning reference plate which is disposed in the vicinity of the abovementioned machining apparatus and which is constructed so that when a specified position on the abovementioned spectacle lens is caused to contact the abovementioned specified position on this positioning reference plate, the machining area of the abovementioned spectacle lens is maintained in a fixed positional relationship with a machining reference position of the machining apparatus, and a machining step of machining the spectacle lens (which has been positioned by the abovementioned positioning step) by means of the abovementioned machining apparatus.

The third means comprise the spectacle lens machining method of the second means, wherein a spectacle lens holding jig which is attached to the machining reference position on the spectacle lens beforehand as a jig which is used to fasten the spectacle lens to a lens edging machine prior to the edging of the spectacle lens in which the spectacle lens is edged so that the abovementioned spectacle lens conforms to the frame shape is used as the abovementioned spectacle lens holding jig, and the abovementioned spectacle lens holding jig attachment step is performed prior to the abovementioned spectacle lens edging.

The fourth means constitute the spectacle lens machining method of any of the first through third means, wherein the abovementioned machining apparatus that machines the spectacle lenses after said edging has been performed is a cutting machining apparatus which is controlled by numerical control.

The fifth means constitute a spectacle lens machining apparatus for machining spectacle lenses after spectacle lens edging has been performed in which the abovementioned spectacle lenses are edged so that they conform to the spectacle frame shape, wherein the abovementioned spectacle lens machining apparatus has spectacle lens fastening devices which are disposed in the vicinity of the machining position of the abovementioned machining apparatus, the abovementioned spectacle lens fastening devices being equipped with fastening parts that fasten the abovementioned spectacle lenses in a specified positional relationship, and the abovementioned spectacle lens fastening devices positioning the abovementioned spectacle lenses fastened to the abovementioned fastening parts by adjusting the positions of the abovementioned spectacle lenses relative to the abovementioned machining apparatus, and the abovementioned fastening parts have a structure in which the spectacle lenses are fastened to the fastening devices by fastening spectacle lens holding jigs which are attached to the machining reference positions of the spectacle lenses beforehand as jigs for fastening the spectacle lenses to the edging machine during the abovementioned edging.

The sixth means constitute a spectacle lens machining apparatus comprising a machining apparatus which machines spectacle lenses, spectacle lens fastening devices which are disposed in the vicinity of the machining position of the abovementioned machining apparatus, these spectacle lens fastening devices having fastening parts which fasten, in a specified positional relationship, spectacle lens holding jigs that are attached to the machining reference positions of the spectacle lenses beforehand as jigs for fastening the spectacle lenses to the edging machine during the abovementioned edging, said spectacle lens fastening devices further fastening the abovementioned spectacle lenses in place by fastening the abovementioned spectacle lens holding jigs to the abovementioned fastening parts, and said spectacle lens fastening devices further having position adjustment mechanism parts which position the abovementioned fastened spectacle lenses by adjusting the positions of these lenses relative to the abovementioned machining apparatus, and a positioning reference plate which is disposed in the vicinity of the machining position of the abovementioned machining apparatus, this positioning reference plate having positioning contact parts which are constructed so that the machined parts of the abovementioned spectacle lenses are in a fixed positional relationship with the machining reference position of the abovementioned machining apparatus when specified positions on the abovementioned spectacle lenses are caused to contact specified positions on the abovementioned positioning reference plate, wherein positioning of the abovementioned spectacle lenses is accomplished by adjusting the positions of the abovementioned spectacle lenses by means of the abovementioned spectacle lens fastening devices so that specified positions on the abovementioned spectacle lenses are caused to contact specified positions on the positioning contact parts of the abovementioned positioning reference plate, and the abovementioned spectacle lenses are machined by the abovementioned machining apparatus.

In the abovementioned first and fifth means, the spectacle lens holding jigs that are attached to the machining reference positions of the spectacle lenses beforehand as jigs for fastening the spectacle lenses to the edging machine during edging can be utilized "as is" and fastened to the fastening devices; accordingly, the operation of fastening the spectacle lenses to the fastening devices can be performed simply and accurately.

In the abovementioned second, third, and sixth means, a spectacle lens holding jig is attached to a specified position on the spectacle lens, this holding jig is fastened to a fastening device, and a specified position on the spectacle lens is caused to contact a specified position on a positioning reference plate. As a result, the spectacle lens can be positioned so that the machining area of the spectacle lens is in a fixed positional relationship with the machining reference position of the abovementioned machining apparatus. Consequently, the machining area of the lens can be quickly and easily fastened in the machining position even if the thickness and shape of the lens vary.

In the abovementioned fourth means, cutting machining using numerical control can be efficiently performed.

100 . . . spectacle lens; 200 . . . machining apparatus; 300 . . . positioning reference plate; 400 . . . spectacle lens fastening devices

BEST MODE FOR CARRYING OUT THE INVENTION

Figure 1:
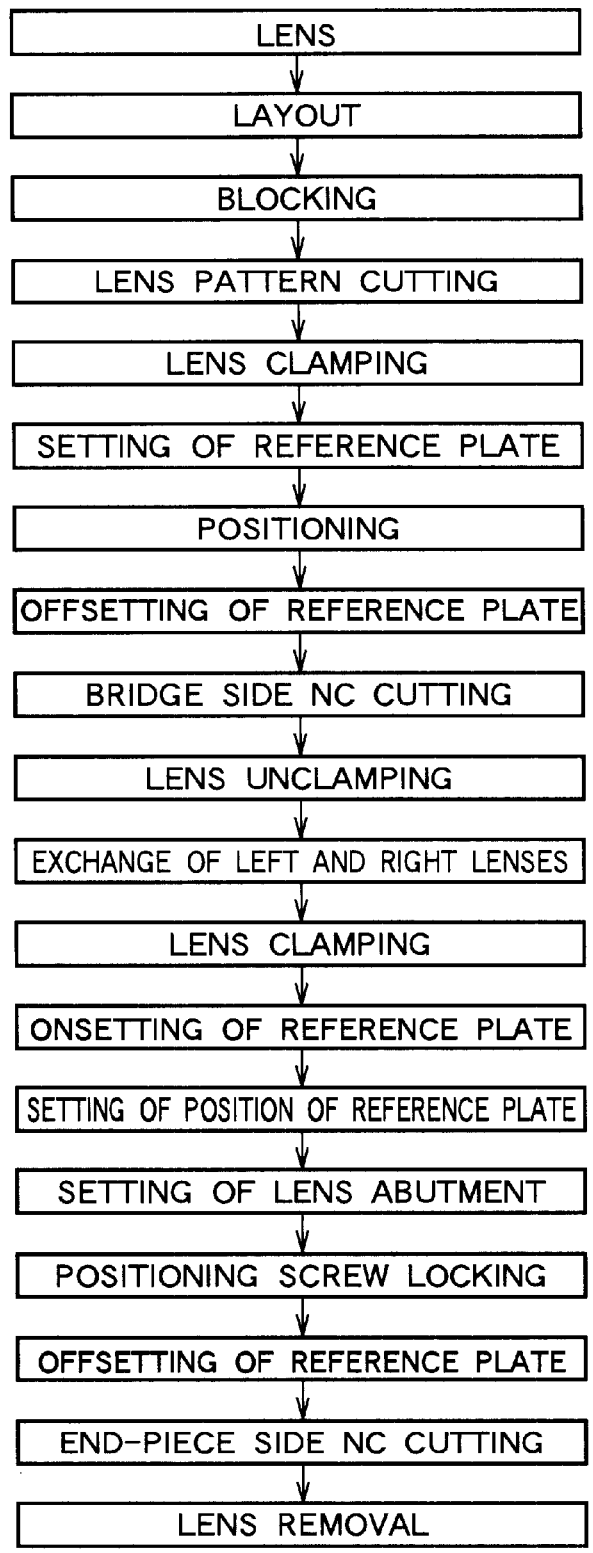
FIG. 1 is a flow chart which illustrates the procedure of a spectacle lens machining method constituting one embodiment of the present invention.
Figure 2:
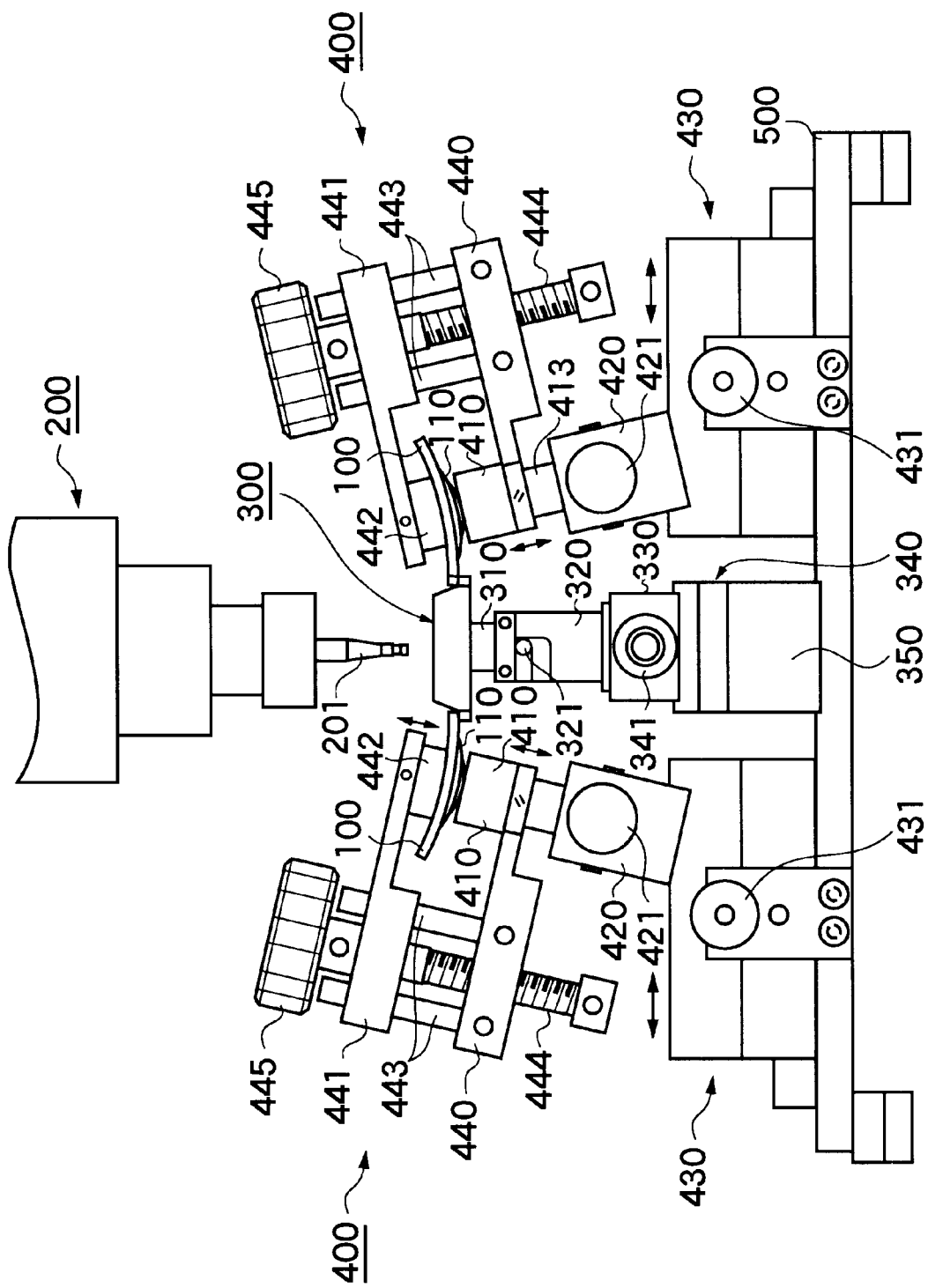
FIG. 2 is a diagram which shows the construction of a spectacle lens machining apparatus constituting one embodiment of the present invention.
Figure 3:
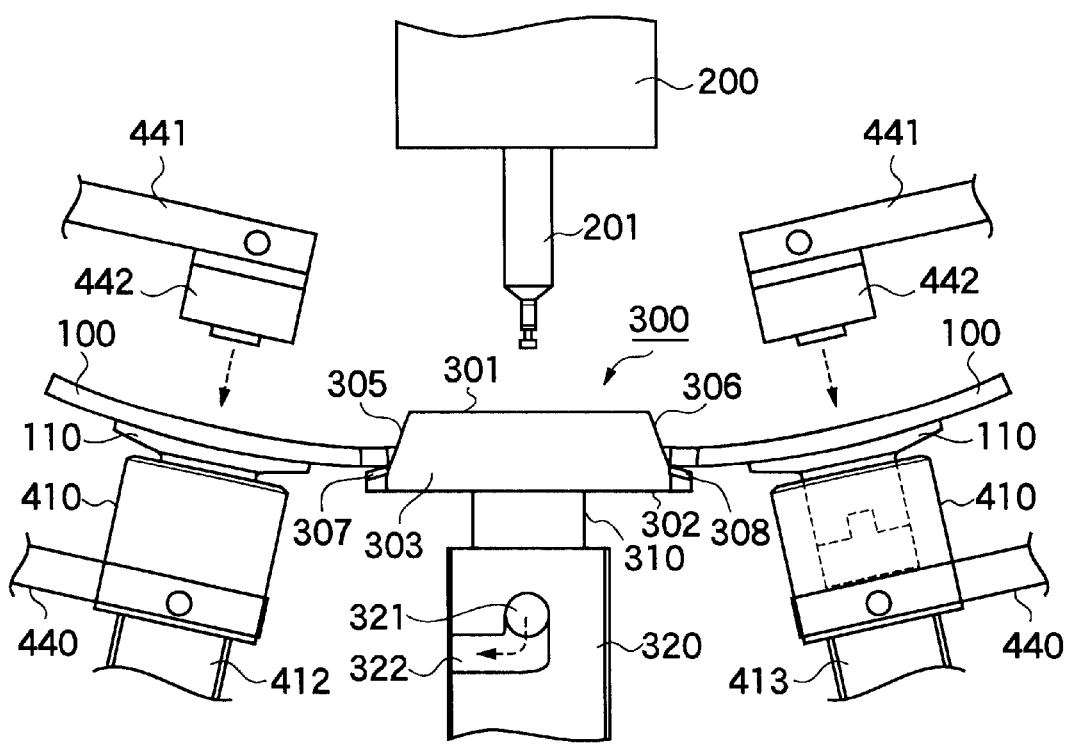
FIG. 3 is an enlarged view of FIG. 2.
Figure 4:
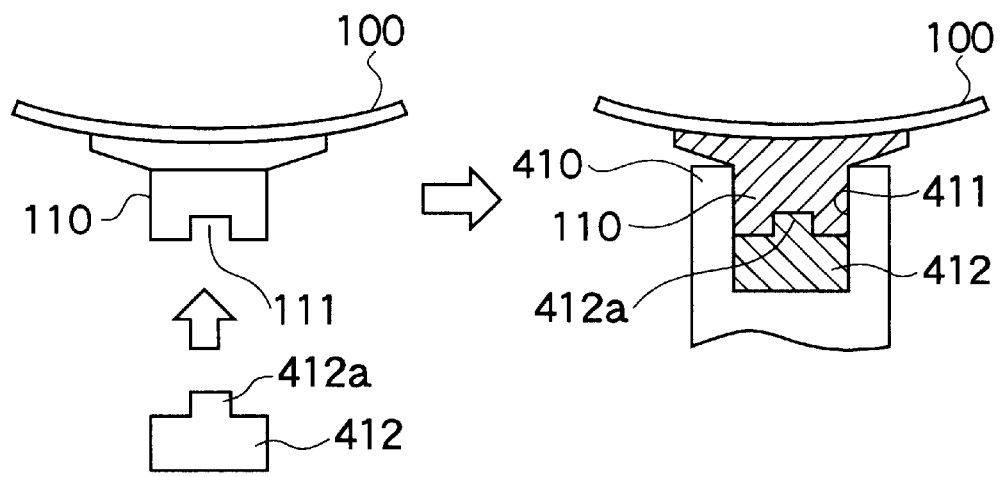
FIG. 4 is a diagram which shows the construction of the spectacle lens holding jig.
Figure 5:
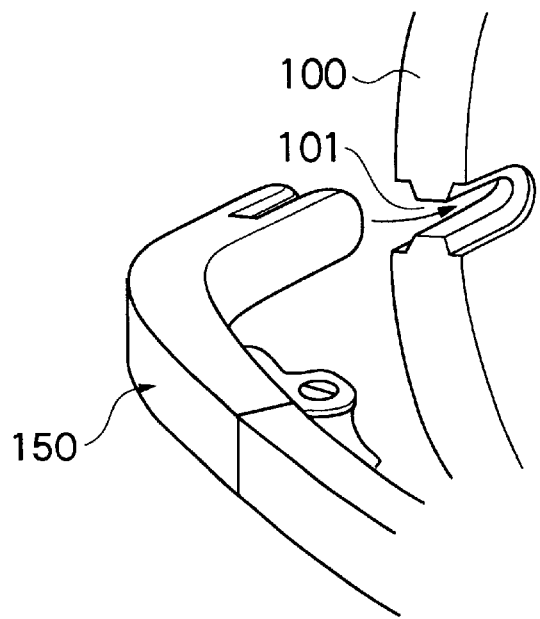
FIG. 5 is a diagram which shows an example of groove machining.
Figure 6:
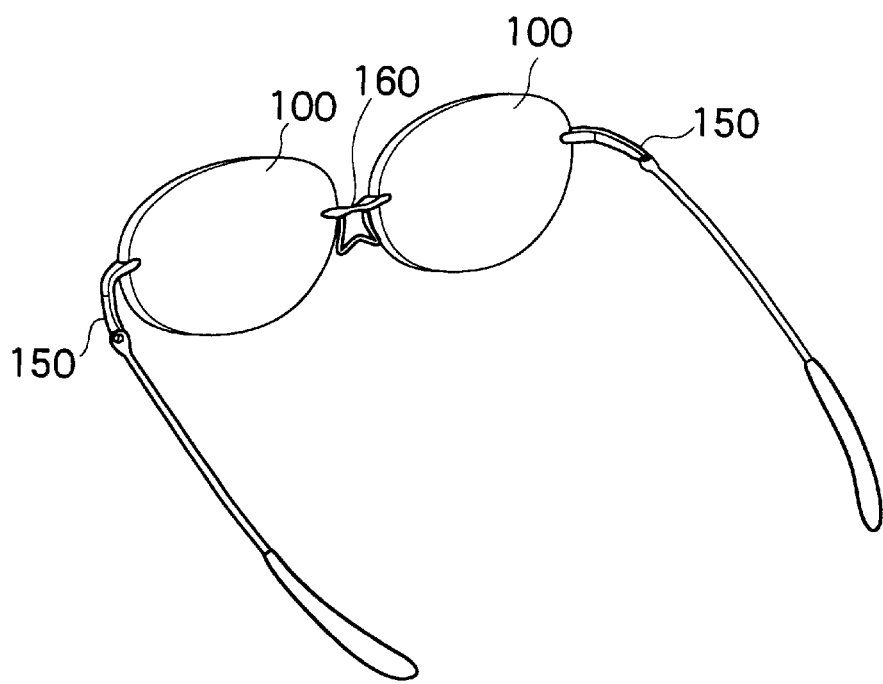
FIG. 6 is a diagram which shows an example of spectacles with end-pieces and bridge attached following groove machining.

FIG. 1 is a flow chart which illustrates the procedure of a spectacle lens machining method constituting one embodiment of the present invention, FIG. 2 is a diagram which shows the construction of a spectacle lens machining apparatus constituting one embodiment of the present invention, FIG. 3 is an enlarged view of FIG. 2, FIG. 4 is a diagram which shows the construction of the spectacle lens holding jig, FIG. 5 is a diagram which shows an example of groove machining, and FIG. 6 is a diagram which shows an example of spectacles with end-pieces and bridge attached following groove machining. Below, a spectacle lens machining apparatus constituting one embodiment of the present invention will first be described, and a spectacle lens machining method constituting one embodiment of the present invention will then be described, with reference to the abovementioned figures.

In FIG. 2, the spectacle lens machining apparatus constituting an embodiment of the present invention performs groove machining by means of a cutting machining apparatus 200 with numerical control in the edge portions of left and right spectacle lenses 100 that have been subjected to edging. Specifically, machining is performed after the spectacle lens 100 in question has been positioned and fastened by a positioning reference plate 300 and a fastening device 400 so that the machining area of the spectacle lens 100 is in a fixed positional relationship with the machining reference position of the machining apparatus 200, e.g., the position of a cutting blade 201.

The cutting machining apparatus 200 performs specified machining such as groove machining, hole machining or the like while rotating the cutting blade 201 in accordance with machining command signals from a computer or the like (not shown in the figures).

As is shown in FIG. 3, the positioning reference plate 300 is a metal block whose cross-sectional shape is substantially trapezoidal. If the surface facing toward the cutting blade 201 is taken as the upper surface 301, then the positioning reference plate 300 has a lower surface 302 that is substantially parallel to this upper surface, a front surface 303 (the back surface is not shown in the figures), and left-right reference surfaces 305 and 306 which constitute the left and right surfaces of the positioning reference plate 300. The left-right reference surfaces 305 and 306 are inclined surfaces (the angle of inclination is 15 to 45° relative to the plane perpendicular to the upper and lower surfaces); these surfaces are used as surfaces that regulate the position with respect to the left-right direction. Furthermore, vertical reference surfaces 307 and 308 that regulate the position with respect to the vertical direction are disposed on the lower end portions of the left-right reference surfaces 305 and 306.

The vertical reference surfaces 307 and 308 are also inclined surfaces, and are respectively inclined by 10 to 30° with respect to the upper and lower surfaces 301 and 302. The positioning reference plate 300 is constructed in such a manner that when the positions of the spectacle lenses 100 are determined so that specified positions on the spectacle lenses 100, e.g., the end surfaces of the machining areas, are caused to contact the abovementioned left-right reference surfaces 305 and 306, and the respective edge parts (on one side) of the optical surfaces of the machining areas of the abovementioned spectacle lenses 100 are caused to contact the vertical reference surfaces 307 and 308, the positions of the machining areas of the abovementioned spectacle lenses 100 are inevitably maintained in a specified positional relationship with the reference position of the cutting blade 201 of the abovementioned cutting machining apparatus 200.

A supporting shaft 310 is attached to the lower surface 302 of the positioning reference plate 300. This supporting shaft 310 is attached to a retraction mechanism part 320 so that the supporting shaft 310 can be freely retracted, and this retraction mechanism part 320 is attached to a forward-backward moving table 330. The abovementioned forward-backward moving table 330 is attached to a forward-backward moving mechanism part 340 so that the forward-backward moving table can freely move forward and backward, and this forward-backward moving mechanism part 340 is fastened to a fastening table 350. The forward-backward moving table 330 is arranged so that the forward-backward position of the positioning reference plate 300 can be accurately adjusted to a designated position by turning and adjusting a forward-backward position adjustment knob 341.

The system is constructed so that when the system is set in the state for the positioning operation, the positions of the abovementioned positioning reference plate 300 in the vertical and left-right directions are inevitably maintained in a specified positional relationship with respect to the machining reference position of the abovementioned machining apparatus 200, and only the position in the forward-backward direction can be varied by the abovementioned forward-backward moving table 330. As will be described later, the forward-backward position of the forward-backward moving table 330 is determined from the pattern shape data of the spectacle lenses, lens edge thickness data, machining position data and the like; accordingly, this position is calculated by a computer which has a program for determining the position of the forward-backward moving table 330 from these values, and the position is set on the basis of this calculated value by turning and adjusting the forward-backward position adjustment knob 341. After the position of the positioning reference plate 300 has thus been determined, the spectacle lenses 100 are positioned by causing the end surfaces and the like of the spectacle lenses held in the spectacle lens fastening devices 400 to contact the abovementioned reference surfaces of the positioning reference plate 300.

Furthermore, when machining is to be performed, the abovementioned positioning reference plate 300 is retracted by the retraction mechanism part 320 to a position in which the positioning reference plate 300 does not interfere with the machining of the spectacle lenses 100 by the cutting blade 201. Specifically, the supporting shaft 310 is moved in such a direction that the clamping pin 321 is guided by a guide groove 322, so that the positioning reference plate 300 is positioned outside the region of the machining track of the cutting blade 201.

The spectacle lens fastening devices 400 determine the positions of the spectacle lenses 100 during machining, and fasten the spectacle lenses 100 in place, by holding and adjusting the positions of the spectacle lenses 100 so that the edge surfaces or the like of these spectacle lenses 100 are caused to contact the reference surfaces of the abovementioned positioning reference plate 300.

Specifically, as is shown in FIG. 4., spectacle lens holding jigs 110 are attached to specified positions on the spectacle lenses 100 prior to edging. The spectacle lens fastening devices 400 have spectacle lens mounting parts 410 which mount these spectacle lens holding jigs 110 with the spectacle lens holding jigs 110 attached "as is".

The spectacle lens mounting parts 410 have mounting holes 411, and mount the spectacle lens holding jigs 110 inside these mounting holes 411 via rotation-checking fittings 412. Specifically, although this is not indicated in the figures, the rotation-checking fittings 412 are inserted into the mounting holes 411 in a fixed state with respect to the direction of rotation. Furthermore, rotation-checking projections 412a are formed on the upper parts of these rotation-checking fittings 412. Accordingly, when the spectacle lens holding jigs 110 are inserted into the mounting holes 411, the spectacle lens holding jigs 110 are mounted inside the abovementioned mounting holes 411 in a state in which the abovementioned rotation-checking projections 412a are inserted into bearing grooves 111 formed in the spectacle lens holding jigs 110. In this case, the spectacle lens holding jigs 110 are attached so that the centers of the spectacle lens holding jigs 110 are positioned at specified positions on the spectacle lenses 100, i.e., ordinarily in the machining centers, and the orientations of the bearing grooves 111 are also fixed in specified directions; accordingly, in the state where the spectacle lenses are attached to the abovementioned mounting parts 410, if at least one position of each spectacle lens is specified, all positions can be specified according to lens shape data or the like.

The spectacle lens mounting parts 410 are attached to vertical adjustment shafts 413, and these vertical adjustment shafts 413 are attached to bearing boxes 420 so that the vertical adjustment shafts 413 are free to move in the vertical direction (i. e., in the direction of the Z axis). These bearing boxes 420 are attached to left-right moving mechanisms 430 so that the bearing boxes 420 are free to move in the left-right direction (i.e., in the direction of the X axis), and these left-right moving mechanisms 430 are attached to a base 500. Locking knobs 421 which lock the movement of the vertical adjustment shafts 413 are disposed on the bearing boxes 420, and locking knobs 431 which lock the left-right movement are disposed on the left-right moving mechanisms 430. Furthermore, the abovementioned bearing boxes 420 are attached to the left-right moving mechanisms 430 so that these bearing boxes 420 are inclined at a specified angle (0 to 30°) with respect to the vertical direction. This attachment angle is desirable in order to set an appropriate value according to the base curve of the lenses. In the present embodiment, an example in which this attachment angle is fixed is described; if necessary, however, an angle adjustment mechanism may be provided. Furthermore, fixed clamping bars 440 are attached to the abovementioned vertical adjustment shafts 413, and movable clamping bars 441 are attached to these fixed clamping bars 440 so that the movable clamping bars 441 are free to move upward and downward. The tip ends of these movable clamping bars 441 are extended to points above the abovementioned spectacle lens mounting parts 410, and clamping heads 442 are attached to the sides of the tip end portions of the movable clamping bars 441 that face the spectacle lens mounting parts 410. Two guide poles 443 whose lower ends are fastened to the fixed clamping bars 440 are passed through each of the movable clamping bars 441 so that the movable clamping bars 441 are free to move in the vertical direction. Furthermore, screw rods 444 which are screwed into the fixed clamping bars 440 at one end are fastened to the movable clamping bars 441 at the other end so that these screw rods 444 are free to rotate. Accordingly, the movable clamping bars 441 can be caused to move by rotating knobs 445 formed on the end portions of the screw rods 444 at the abovementioned second ends of the screw rods 444, so that the clamping heads 442 are pressed against the spectacle lenses 100 mounted on the spectacle lens mounting parts 410, thus fastening the spectacle lenses 100 in place.

In a state in which the abovementioned spectacle lens fastening devices 400 have fastened the spectacle lenses 100 in place, the positions of these spectacle lenses 100 with respect to the direction of rotation (circumferential direction) and the positions of the spectacle lenses with respect to the forward-backward direction (i.e., the direction of the Y axis) are definitively determined; however, the positions of the spectacle lenses 100 with respect to the vertical direction (the direction of the Z axis) and the left-right direction (direction of the X axis) can be adjusted. These positions with respect to the vertical direction (direction of the Z axis) and left-right direction (direction of the X axis) are determined by means of the positioning reference plate 300.

Specifically, in a state in which the spectacle lenses 100 have been fastened to the abovementioned spectacle lens fastening devices 400, the spectacle lenses 100 are positioned by moving the vertical adjustment shafts 413 to which the spectacle lens mounting parts 410, fixed clamping bars 440 and movable clamping bars 441 are attached, and at the same time moving the abovementioned vertical adjustment shafts 413 together with the gear boxes 420 by means of the left-right adjustment mechanisms 430, so that the end surfaces or the like of the spectacle lenses 100 are caused to contact the abovementioned respective reference surfaces of the positioning reference plate 300. As a result, specified positions on the spectacle lenses 100, e.g., the machining areas, are maintained in a specified relationship with the machining reference position of the machining apparatus 200. Accordingly, specified machining can be accomplished by sending specified machining command signals to the machining apparatus.

The example shown in FIG. 2 is an example in which the left and right lenses are simultaneously positioned and the machining of end-piece attachment grooves and bridge attachment grooves is performed. Specifically, as is shown in FIGS. 5 and 6, the term "end-piece attachment grooves" refers to grooves 101 into which the end-pieces 150 are inserted and fastened by bonding in the ear side end portions of the spectacle lenses 100 following edging. Furthermore, the term "bridge attachment grooves" refers to grooves which are used for the insertion of both end portions of the bridge 160.

In this machining, the positioning reference plate 300 is retracted following the abovementioned positioning, and (for example) the lens on the left side in the figures is cut by the cutting blade 201 and thus subjected to groove machining for the attachment of the end-piece. Next, the cutting blade 201 is moved, and the lens on the right side is machined. When this machining is completed, the left and right lenses are exchanged, and groove machining for the attachment of the bridge is similarly performed. In this case, the machining data is sent from a computer (not shown in the figures) as described above.

Next, a spectacle lens machining method constituting an embodiment of the present invention will be described with reference to FIG. 1. In FIG. 1, the term "lens" refers to an unworked round lens. The unworked round lens that is selected in this case is a lens which has a specified magnification and shape based on a prescription for the eyes of the user or other necessary prescription, and spectacle frame shape data or the like.

Layout

First, a lens layout is performed as a prerequisite for the selection of the abovementioned round lenses. The term "lens layout" refer s to the disposition of the position of the optical center in the edging shape (=lens pattern shape= geometrical shape) so that the centers of the pupils of the user will coincide with the optical centers of the lenses when the round lenses are edged in accordance with the frame shape and inserted into the frames, and these frames are donned by the use r of the spectacles. Specifically, because of differences between the shape and size of the frames and the size of the face of the user, agreement between the positions of the pupils and the center positions of the geometrical shapes of the frames (lens pattern shapes) is generally rare. Accordingly, when the positions of the pupils are caused to coincide with the geometrical centers of the lenses, these positions deviate from the optical centers, so that a disposition that corrects this deviation is necessary. In other words, the amount of deviation between the geometrical centers and the optical centers in the lens pattern shapes is determined, and the geometrical centers are shifted by an amount corresponding to the amount of deviation from the optical centers of the round lenses, so that the geometrical centers are positioned as the centers of the target shapes for edging.

Blocking

Next, blocking is performed on the basis of the results of the abovementioned layout. This blocking refers to the attachment of the spectacle lens holding jigs 110 (see FIG. 4), which are used to fasten the lenses to the lens fastening shafts of the edging machine (when edging is performed by this edging machine), to specified positions on the spectacle lenses, e.g., the positions of the optical centers or geometrical centers of the lenses.

The attachment is performed so that the spectacle lens holding jigs 110 are firmly bonded to the spectacle lenses 100 by interposing a two-sided tape that is as thin as possible between the spectacle lenses 100 and the spectacle lens holding jigs 110. In this case, furthermore, since the spectacle lenses are cut while cutting water is applied to the lenses, it is necessary that the abovementioned two-sided tape have an ample water resistance. Moreover, in order to avoid oscillation or shifting of the lens during lens cutting or lateral groove machining, it is advisable that the tape used have a thickness of 0.5 millimeters or less. Some other method may also be used to bond the spectacle lens holding jigs 110 to the spectacle lenses 100. The attachment surfaces may be on either the convex sides or concave sides of the lenses.

Lens Pattern Cutting

The term "lens pattern cutting" refers to edging of the round lenses in conformity to the shape of the frames. The spectacle lens holding jigs 110 attached to the abovementioned spectacle lenses 100 are attached to the lens fastening shafts of the edging machine, and edging is performed by a method such as shape-following grinding or the like while the lenses are rotated.

Lens Clamping

The spectacle lenses 100 in which edging has been completed are mounted on the abovementioned spectacle lens mounting parts 410 with the abovementioned spectacle lens holding jigs left attached "as is", and the movable clamping bars 441 are lowered so that the clamping heads 442 press against the spectacle lenses 100 and fasten the spectacle lenses 100 in place. Furthermore, the method used to fasten the spectacle lenses 100 in place is not limited to the abovementioned embodiment; besides screw type clamping, it would also be possible to use an air system, hydraulic pressure or an electric motor system.

Setting of Reference Plate (Bridge Side)

Once the spectacle lenses 100 have been fastened in place, the positioning reference plate 300 is set. Specifically, the forward-backward position of the positioning reference plate 300 is accurately adjusted to a designated position by turning and adjusting the forward-backward position adjustment knob 341. This position varies according to the lens pattern and size; in the present embodiment, a worker loads the data of the operating instructions into a computer, so that the set position is automatically displayed on the display of the computer. The worker then sets the positioning reference plate 300 in accordance with this displayed value. Furthermore, instead of being performed manually, this adjustment could also be performed using an automatic adjustment mechanism that is directly linked to the computer.

Positioning (Bridge Side)

Next, the abovementioned clamped spectacle lenses 100 are positioned by being caused to contact the reference surfaces of the abovementioned positioning reference plate 300. The position of the positioning reference plate 300 is accurately taken as a reference point in three-dimensional space by an NC machining machine, and programming is performed so that the cutting blade 201 will move in accordance with respective items using the position of this positioning reference plate as a reference. Accordingly, the machining of specified shapes can be performed in specified positions on the lenses that have been set in accordance with the positioning reference plate.

Furthermore, the abutting portions of the positioning reference plate are pointed so that these portions contact the lenses at single points. However, even if the lenses are slightly scratched by these pointed portions, the scratched portions are portions that are cut away by the cutting of the next process; accordingly, this causes no particular problems. In the present embodiment, the reference surfaces 307 and 308 of the positioning reference plate 300 recede at a angle of approximately 20 degrees with respect to the horizontal plane. Accordingly, for almost all of the lens curve of the convex shape of each lens, the lens edge and the reference surface make contact at a single point.

Offsetting of Reference Plate

Once the abovementioned positioning has been completed, the positioning reference plate 300 is retracted to a region that is outside the machining track of the cutting blade 201. In the present embodiment, furthermore, a method was shown in which the positioning reference plate 300 is fastened by being rotated to right angles after being pushed downward. However, there are no particular limitations on the method used. Any method may be used as long as the positioning reference plate 300 can be shifted as a result to a position where the positioning reference plate 300 does not interfere with the cutting blade during machining.

Bridge Side NC Cutting

Next, using numerical control, the cutting blade 201 is moved by the machining apparatus 200 to a fixed position in the direction of the Z axis from the contact position of the positioning reference plate 300, and cutting is performed for a fixed distance in the direction of the X axis. In the present embodiment, the cutting direction is set so that the cutting blade 201 is caused to move only in the direction of the X axis parallel to the datum line; however, there are no particular limitations on the machining direction. Movement in a diagonal direction on the XY plane is possible, and movement according to a predetermined shape (e.g., an oval shape) is also possible. Furthermore, movement in the Z direction as well as on the XY plane is also possible. In this way, grooves of various shapes can be formed in the lenses by means of a single cutter.

In the present embodiment, the rotational speed of the cutting blade 201 is set at 1,000 to 3,000 rpm. However, this speed varies according to the type of glass being machined and the shape of the cutter used, and is not limited to any particular value. In order to prevent melting of the lenses caused by the heat of machining during cutting, it is desirable to provide cooling based on air or cutting water.

Lens Unclamping

The clamping that fastens the lenses is loosened, and the lenses are removed.

Exchange of Left and Right Lenses

The left and right lenses fastened to the lens fastening devices 400 are exchanged with each other. In this case, the lenses are set so that the vertical orientation is not changed.

Lens Clamping

The exchanged lenses are fastened in the same manner as described above.

Onsetting of Reference Plate

The retracted positioning reference plate 300 is returned to the set position.

Setting of Position of Reference Plate (End-piece Side)

The positioning reference plate 300 is set in the position where the end-pieces are attached. The worker sets the position of the positioning reference plate 300 in accordance with the set value on the end-piece side disposed by the display of the computer.

Positioning (End-piece Side)

The spectacle lenses are fastened in specified positions by causing the spectacle lenses 100 to contact the reference surfaces of the positioning reference plate 300 in the same manner as described above.

Offsetting of Reference Plate

The positioning reference plate 300 is retracted in the same manner as described above.

End-piece Side NC Cutting

The cutting blade 201 is move to a fixed position in the direction of the Z axis from the contact position of the positioning reference plate 300 using numerical control in the same manner as described above, and cutting is performed for a fixed distance in the direction of the X axis.

Lens Removal

The clamping of the spectacle lenses 100 is loosened, and the lenses are removed.

In the abovementioned embodiment, the positioning and fastening of the groove machining jigs can be performed without removing the spectacle lens holding jigs fastened to the lenses in which lens edging has been completed, i.e., with these jigs fastened to the lenses "as is". As a result, groove machining for the purpose of forming grooves running into the spectacle lenses from the edge surfaces of the lenses can be performed accurately and with good reproducibility, and by means of a simple operation, for lenses with various types of lens patterns. Furthermore, the series of operations extending form the lens edging of the element lenses to the groove machining of the lenses can be made more efficient.

Figure 7:
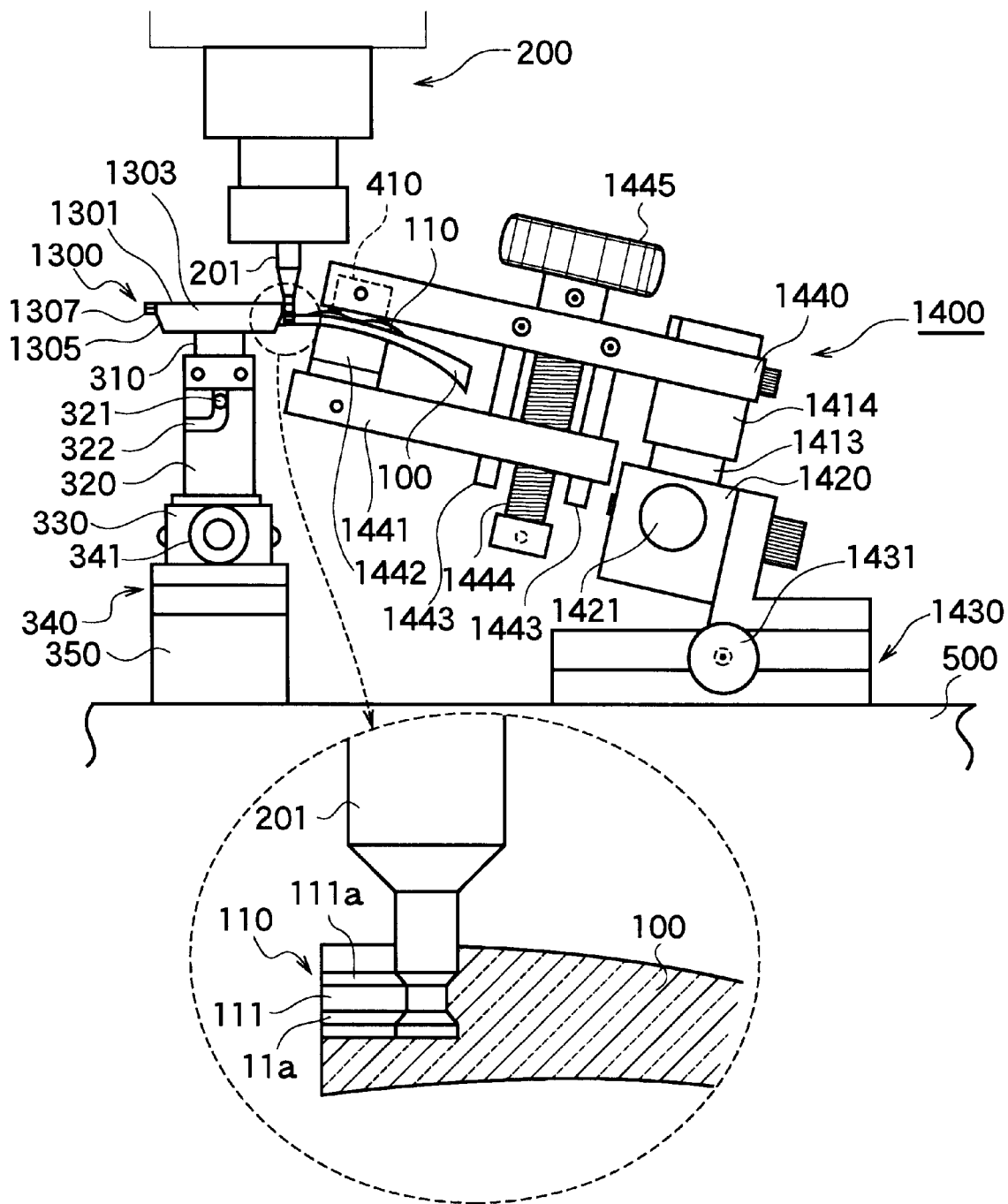
FIG. 7 is a diagram which shows the construction of a spectacle lens machining apparatus constituting another embodiments of the present invention.

FIG. 7 is a diagram which illustrates the construction of a spectacle lens machining apparatus constituting another embodiment of the present invention. The spectacle lens machining apparatus shown in FIG. 7 is an example of an apparatus which is devised so that the spectacle lenses 100 are held with the convex surface sides of the spectacle lenses facing upward, and so that the cutting blade 201 performs cutting machining by contacting the abovementioned lenses from the convex surface sides. Specifically, in the embodiment described previously, an example was described in which the lenses 100 were held with the convex surfaces of the lenses 100 facing downward, and machining was performed from the concave surface sides of the lenses. However, the embodiment described below is an example of an apparatus which is devised so that the lenses 100 are held and machined with the surfaces of the lenses reversed from the case of the embodiment described above.

In this embodiment, since the lens surfaces are held in an attitude that is the reverse of that in the abovementioned embodiment, the structure of the embodiment comprises parts that are the same and parts that differ in terms of detailed structure but that have more or less the same function. Accordingly, in the following description, parts of the structure that are the same are labeled with the same symbols as in the abovementioned embodiment, and parts that differ in terms of detailed structure but have the same function are labeled with symbols formed by adding 1000 to the numerical values of the symbols used in the abovementioned embodiment. Furthermore, descriptions that are thought to be redundant are appropriately omitted.

In FIG. 7, the spectacle lens machining apparatus of the present embodiment is used (for example) in a case where groove machining or the like which has opening parts in the convex surface sides as indicated by the dotted-line circles in FIG. 7 is performed by means of a numerically controlled cutting machining apparatus 200 in the edge parts of the left and right spectacle lenses 100 that have been subjected to edging.

The positioning reference plate 1300 is attached to the supporting shaft 310 in an attitude that is the reverse of that of the positioning reference plate 300 in the abovementioned embodiment (see FIGS. 2 and 3); the remaining structures are identical to those of the abovementioned embodiment. Accordingly, in FIG. 7, the part that corresponds to the reference surface 307 of the abovementioned embodiment is the reference surface 1307, and in the figures, a reference surface that corresponds to the reference surface 308 in the abovementioned embodiment is formed on the part that is contacted by the end surface of the corresponding lens 100. The portion of the lens 100 that is machined is positioned by being caused to contact this reference surface. Furthermore, the retraction mechanism part 320 to which this supporting shaft 310 is attached, the forward-backward moving table 330, the forward-backward moving mechanism part 340, the fastening table 350 and the like are the same as in the abovementioned embodiment.

Each of the spectacle lens fastening devices 1400 is constructed as follows: specifically, a left-right moving mechanism 1430 is fastened to a base 500. A bearing box 1420 is fastened to this left-right moving mechanism 1430 by an L-shaped fitting used for attachment. A vertical adjustment shaft 1413 which is free to move in the vertical direction (i.e., in the direction of the Z axis) is attached to this bearing box 1420. A locking knob 1421 which locks the movement of the vertical adjustment shaft 1413 is disposed on the bearing box 1420; furthermore, a locking knob 1431 which locks the movement in the left-right direction is disposed on the left-right movement mechanism 1430. Furthermore, the abovementioned bearing box 1420 is attached to the left-right movement mechanism 1430 so that this bearing box 1420 is inclined by a specified angle (0 to 300) relative to the vertical direction. It is desirable that this attachment angle be set at an appropriate value in accordance with base curve of the lenses. Accordingly, in the present embodiment, an example is described in which this attachment angle is fixed; however, it would also be possible to install an angle adjustment mechanism if necessary.

Furthermore, a fixed clamping bar 1440 is attached to the abovementioned vertical adjustment shaft 1413 by means of a fastening fitting 1414, and a movable clamping bar 1441 is attached to this fixed clamping bar 1440 so that this movable clamping bar 1441 is free to move in the vertical direction. Specifically, two guide poles 1443 whose upper ends are fastened to the fixed clamping bar 1440 are passed through the movable clamping bar 1441, so that the movable clamping bar 1441 is free to move in the vertical direction. Furthermore, a screw rod 1444 which is screwed into the movable clamping bar 1441 at one end is fastened to the fixed clamping bar 1440 at the other end so that this screw rod 1444 is free to rotate, and the movable clamping bar 1441 can be moved upward or downward by rotating a knob 1445 which is formed on the abovementioned second end of the screw rod 1444.

Furthermore, a spectacle lens mounting part 410 is mounted and fastened to tip end portion of the fixed clamping bar 1440. Furthermore, a clamping head 1442 is fastened to the tip end of the movable clamping bar 1441. Accordingly, the movable clamping bar 1441 is moved by rotating the knob 1445 of the screw rod 1444, so that the clamping head 1442 is pressed against the spectacle lens 100 mounted on the spectacle lens mounting part 410, thus fastening the spectacle lens 100 in place.

The abovementioned spectacle lens fastening device 1400 is devised so that in a state in which the spectacle lens 100 is fastened in place, the position of this spectacle lens 100 in the direction of rotation (circumferential direction) and the position of the spectacle lens 100 in the forward-backward direction (direction of the Y axis) are definitively determined. However, the position in the vertical direction (direction of the Z axis) and the position in the left-right direction (direction of the X axis) can be adjusted. The position in the vertical direction (direction of the Z axis) and the position in the left-right direction (direction of the X axis) are determined by the positioning reference plate 1300. In the present embodiment, positioning can be accomplished in a state in which the convex surface of each lens 100 faces upward, so that machining of the type indicated by the dotted-line circles in FIG. 7 can be accomplished with good efficiency.

Furthermore, in the embodiments described above, positioning was accomplished by causing specified positions on the spectacle lenses to contact specified positions on the positioning reference plate; however, instead of using a positioning reference plate, it would also be possible to use a contact type or a non-contact type position detection means capable of detecting when specified positions on the spectacle lenses reach certain positions. For example, it would also be possible to use position detection means having a position detection probe, and having a position detection probe which sends position information concerning the point of contact when a physical object contacts this probe. Alternatively, it would also be possible to use position detection means employing a detector that performs position detection in a non-contact manner using electromagnetic waves or the like instead of such a contact type position detection probe.

INDUSTRIAL APPLICABILITY

In the present invention, as is clear from the above description, spectacle lenses are positioned so that the machining areas of the spectacle lenses are maintained in a fixed positional relationship with the machining reference position of the machining apparatus by using spectacle lens fastening devices which can fasten the spectacle lenses with attached spectacle lens holding jigs in place, and adjust the positions of these spectacle lenses, to cause specified positions on the spectacle lenses to contact the reference surfaces of a positioning reference plate. As a result, a spectacle lens machining method and apparatus which make it possible to perform machining that forms holes or grooves for the attachment of parts to the outer circumferential edge surfaces of lenses of various lens patterns, both accurately and with good reproducibility, and by means of a simple operation, are obtained.

What is claimed is:

1. A spectacle lens machining method for machining spectacle lenses using a machining apparatus after spectacle lens edging has been performed in which said spectacle lenses are edged so that they conform to the spectacle frame shape, wherein the machining by said machining apparatus is performed with the spectacle lenses fastened to spectacle lens fastening devices which are disposed in the vicinity of the machining position of said machining apparatus, said spectacle lens fastening devices being equipped with fastening parts that fasten said spectacle lenses in a specified positional relationship, and said spectacle lens fastening devices positioning said spectacle lenses fastened to said fastening parts by adjusting the positions of said spectacle lenses relative to said machining apparatus, and, as the fastening devices, are used those devices said fastening parts of which have a structure in which the spectacle lenses are fastened to the fastening devices by fastening spectacle lens holding jigs which are attached to the machining reference positions of the spectacle lenses beforehand as jigs for fastening the spectacle lenses to the edging machine during said edging.

2. The spectacle lens machining method according to claim 1, wherein said machining apparatus that machines the spectacle lenses after said edging has been performed is a cutting machining apparatus which is controlled by numerical control.

3. A spectacle lens machining method in which a spectacle lens of a specified shape is machined by means of a machining apparatus, said method comprising:

a spectacle lens holding jig attachment step of attaching a spectacle lens holding jig to a specified position on said spectacle lens;

a spectacle lens fastening step of fastening said spectacle lens by mounting said spectacle lens holding jig in a spectacle lens fastening device which is disposed in the vicinity of the machining position of said machining apparatus, which fastens said spectacle lens in a specified positional relationship as a result of the mounting of said spectacle lens holding jig, and which positions said spectacle lens by adjusting the position of said spectacle lens fastening device;

a positioning step of positioning the spectacle lens by adjusting the position of said spectacle lens fastening device so that a specified position on said spectacle lens is caused to contact a specified position on a positioning reference plate which is disposed in the vicinity of said machining apparatus and which is constructed so that when a specified position on said spectacle lens is caused to contact said specified position on this positioning reference plate, the machining area of said spectacle lens is maintained in a fixed positional relationship with a machining reference position of the machining apparatus; and a machining step of machining the spectacle lens, which has been positioned by said positioning step, by means of said machining apparatus.

4. The spectacle lens machining method according to claim 3, wherein a spectacle lens holding jig which is attached to the machining reference position on the spectacle lens beforehand as a jig which is used to fasten the spectacle lens to a lens edging machine prior to the edging of the spectacle lens in which the spectacle lens is edged so that said spectacle lens conforms to the frame shape is used as said spectacle lens holding jig, and said spectacle lens holding jig attachment step is performed prior to said spectacle lens edging.

5. The spectacle lens machining method according to claim 4, wherein said machining apparatus that machines the spectacle lenses after said edging has been performed is a cutting machining apparatus which is controlled by numerical control.

6. The spectacle lens machining method according to claim 3, wherein said machining apparatus that machines the spectacle lenses after said edging has been performed is a cutting machining apparatus which is controlled by numerical control.

7. A spectacle lens machining apparatus for machining spectacle lenses after spectacle lens edging has been performed in which said spectacle lenses are edged so that they conform to the spectacle frame shape, wherein said spectacle lens machining apparatus has spectacle lens fastening devices which are disposed in the vicinity of the machining position of said machining apparatus, said spectacle lens fastening devices being equipped with fastening parts that fasten said spectacle lenses in a specified positional relationship, and said spectacle lens fastening devices positioning said spectacle lenses fastened to said fastening parts by adjusting the positions of said spectacle lenses relative to said machining apparatus, and said fastening parts have a structure in which the spectacle lenses are fastened to the fastening devices by fastening spectacle lens holding jigs which are attached to the machining reference positions of the spectacle lenses beforehand as jigs for fastening the spectacle lenses to the edging machine during said edging.

8. A spectacle lens machining apparatus comprising:

a machining apparatus which machines spectacle lenses;

spectacle lens fastening devices which are disposed in the vicinity of the machining position of the abovementioned machining apparatus, these spectacle lens fastening devices having fastening parts to which spectacle lens holding jigs that are attached to the machining reference positions of the spectacle lenses beforehand as jigs for fastening the spectacle lenses to the edging machine during the abovementioned edging are fastened in a specified positional relationship, said spectacle lens fastening devices further fastening the abovementioned spectacle lenses in place by fastening the abovementioned spectacle lens holding jigs to the abovementioned fastening parts, and said spectacle lens fastening devices further having position adjustment mechanism parts which position the abovementioned fastened spectacle lenses by adjusting the positions of these lenses relative to the abovementioned machining apparatus; and a positioning reference plate which is disposed in the vicinity of the machining position of the abovementioned machining apparatus, this positioning reference plate having positioning contact parts which are constructed so that the machined parts of the abovementioned spectacle lenses are in a fixed positional relationship with the machining reference position of the abovementioned machining apparatus when specified positions on the abovementioned spectacle lenses are caused to contact specified positions on the abovementioned positioning reference plate, wherein positioning of the abovementioned spectacle lenses is accomplished by adjusting the positions of the abovementioned spectacle lenses by means of the abovementioned spectacle lens fastening devices so that specified positions on the abovementioned spectacle lenses are caused to contact specified positions on the positioning contact parts of the abovementioned positioning reference plate, and the abovementioned spectacle lenses are machined by the abovementioned machining apparatus.

* * * * *